United States Patent
Yun et al.

(10) Patent No.: US 10,991,943 B2
(45) Date of Patent: Apr. 27, 2021

(54) NICKEL ACTIVE MATERIAL PRECURSOR FOR LITHIUM SECONDARY BATTERY, METHOD FOR PRODUCING NICKEL ACTIVE MATERIAL PRECURSOR, NICKEL ACTIVE MATERIAL FOR LITHIUM SECONDARY BATTERY PRODUCED BY METHOD, AND LITHIUM SECONDARY BATTERY HAVING CATHODE CONTAINING NICKEL ACTIVE MATERIAL

(71) Applicant: Samsung SDI Co., Ltd., Yongin-si (KR)

(72) Inventors: Pilsang Yun, Yongin-si (KR); Jinhwa Kim, Yongin-si (KR); Hyunbeom Kim, Yongin-si (KR); Jaehyun Shim, Yongin-si (KR); Wooyoung Yang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 155 days.

(21) Appl. No.: 16/462,887

(22) PCT Filed: Dec. 4, 2017

(86) PCT No.: PCT/KR2017/014094
§ 371 (c)(1),
(2) Date: May 21, 2019

(87) PCT Pub. No.: WO2018/101806
PCT Pub. Date: Jun. 7, 2018

(65) Prior Publication Data
US 2020/0083530 A1  Mar. 12, 2020

(30) Foreign Application Priority Data
Dec. 2, 2016  (KR) .................... 10-2016-0163895

(51) Int. Cl.
*H01M 4/525* (2010.01)
*H01M 4/505* (2010.01)
(Continued)

(52) U.S. Cl.
CPC ............ *H01M 4/525* (2013.01); *C01G 53/04* (2013.01); *C01G 53/42* (2013.01); *H01M 4/366* (2013.01);
(Continued)

(58) Field of Classification Search
CPC ............................. H01M 4/525; C01G 53/04
See application file for complete search history.

(56) References Cited

U.S. PATENT DOCUMENTS 9,391,318 B2    7/2016  Nagai et al.
9,559,351 B2 *  1/2017  Mori .................. C01G 53/42
(Continued)

FOREIGN PATENT DOCUMENTS

EP    2706599 A1    3/2014
JP    2012-33389 A  2/2012
(Continued)

OTHER PUBLICATIONS

EPO Extended European Search Report dated Jul. 10, 2020, issued in European Patent Application No. 17876067.4 (6 pages).
(Continued)

*Primary Examiner* — Ula C Ruddock
*Assistant Examiner* — Thomas H. Parsons
(74) *Attorney, Agent, or Firm* — Lewis Roca Rothgerber Christie LLP

(57) ABSTRACT

Provided are a nickel-based active material precursor for a lithium secondary battery including a core, an intermediate layer located on the core, and a shell located on the intermediate layer, wherein porosity gradually decreases in the order of the core, the intermediate layer, and the shell, and
(Continued)

each of the intermediate layer and the shell has a radial arrangement structure, a method for producing the nickel-based active material precursor, a nickel-based active material produced therefrom, and a lithium secondary battery including a cathode containing the nickel-based active material.

14 Claims, 4 Drawing Sheets

(51) Int. Cl.
  *H01M 10/0525*    (2010.01)
  *H01M 4/36*    (2006.01)
  *C01G 53/04*    (2006.01)
  *C01G 53/00*    (2006.01)

(52) U.S. Cl.
  CPC ....... *H01M 4/505* (2013.01); *H01M 10/0525* (2013.01)

(56) References Cited

U.S. PATENT DOCUMENTS

| | | | |
|---|---|---|---|
| 10,020,507 | B2 | 7/2018 | Kobayashi et al. |
| 10,243,210 | B2 * | 3/2019 | Park .................. H01M 4/366 |
| 10,708,486 | B2 * | 7/2020 | Lee .................. H04N 5/232125 |
| 2013/0169608 | A1 | 7/2013 | Shin et al. |
| 2013/0230775 | A1 | 9/2013 | Endo |
| 2015/0364759 | A1 | 12/2015 | Kase et al. |
| 2016/0056458 | A1 | 2/2016 | Tamura et al. |
| 2016/0190573 | A1 | 6/2016 | Sun et al. |
| 2017/0222221 | A1 | 8/2017 | Park et al. |
| 2018/0026267 | A1 | 1/2018 | Kim et al. |
| 2018/0108940 | A1 | 4/2018 | Kwon et al. |

FOREIGN PATENT DOCUMENTS

| | | | |
|---|---|---|---|
| JP | 2013-182783 A | | 9/2013 |
| JP | 2014-144894 A | | 8/2014 |
| JP | 2015-72800 A | | 4/2015 |
| JP | 2015-76397 A | | 4/2015 |
| JP | 2016-44120 A | | 4/2016 |
| KR | 20160032787 | * | 9/2014 |
| KR | 20160032787 A | * | 9/2014 |
| KR | 10-2015-0016125 A | | 2/2015 |
| KR | 10-2015-0093252 A | | 8/2015 |
| KR | 10-1593401 B1 | | 2/2016 |
| KR | 10-2016-0049995 A | | 5/2016 |
| KR | 10-2016-0129764 A | | 11/2016 |
| KR | 10-2018-0010123 A | | 1/2018 |

OTHER PUBLICATIONS

Japanese Office Action dated Jul. 27, 2020, issued in Japanese Patent Application No. 2019-529588 (6 pages).

International Search Report for International Application No. PCT/KR2017/014094, dated Mar. 13, 2018, 5pp.

* cited by examiner (A)             (B)             (C)

NICKEL ACTIVE MATERIAL PRECURSOR FOR LITHIUM SECONDARY BATTERY, METHOD FOR PRODUCING NICKEL ACTIVE MATERIAL PRECURSOR, NICKEL ACTIVE MATERIAL FOR LITHIUM SECONDARY BATTERY PRODUCED BY METHOD, AND LITHIUM SECONDARY BATTERY HAVING CATHODE CONTAINING NICKEL ACTIVE MATERIAL

CROSS-REFERENCE TO RELATED APPLICATION(S)

This application is a National Phase Patent Application of International Patent Application Number PCT/KR2017/014094, filed on Dec. 4, 2017, which claims priority of Korean Patent Application No. 10-2016-0163895, filed Dec. 2, 2016. The entire contents of both of which are incorporated herein by reference.

TECHNICAL FIELD

The present disclosure relates to nickel-based active material precursors for lithium secondary batteries, methods for producing the same, nickel-based active materials for lithium secondary batteries produced therefrom, and lithium secondary batteries including cathodes containing the nickel-based active materials.

BACKGROUND ART

With the development of portable electronic devices, communication devices, and the like, there is an increasing demand for lithium secondary batteries having high energy density.

Lithium nickel manganese cobalt composite oxides, lithium cobalt oxides, and the like have been used as cathode active materials of lithium secondary batteries. However, when such a cathode active materials are used, cracks occur in primary particle units with repeated charging and discharging, thereby reducing the long lifespan of a lithium secondary battery, increasing battery resistance, and failing to satisfy desired battery capacity characteristics. Therefore, there is a need to improve these characteristics.

DESCRIPTION OF EMBODIMENTS

Technical Problem

Provided is a nickel-based active material precursor for a lithium secondary battery having an increased lithium ion utilization rate.

Provided is a method of producing the nickel-based active material precursor.

Provided is a nickel-based active material obtained from the nickel-based active material precursor and a lithium secondary battery including a cathode containing the nickel-based active material.

Solution to Problem

According to an aspect of the present disclosure, a nickel-based active material precursor for a lithium secondary battery includes a core, an intermediate layer located on the core, and a shell located on the intermediate layer, wherein porosity gradually decreases in the order of the core, the intermediate layer, and the shell, and each of the intermediate layer and the shell has a radial arrangement structure.

According to another aspect of the present disclosure, a method of producing a nickel-based active material precursor for a lithium secondary battery includes a first process of forming a core of the nickel-based active material precursor by reacting a complexing agent, a pH regulator, and a metal raw material for forming the nickel-based active material precursor, a second process of forming an intermediate layer on the core obtained in the first process, and a third process of forming a shell on the intermediate layer obtained in the second process, wherein stirring powers of the second process and the third process are lower than that of the first process.

The pH levels of reaction mixtures of the first process, the second process, and the third process are the same, and concentrations of the complexing agent gradually increase in the order of the first process, the second process, and the third process.

According to another aspect of the present disclosure, a lithium secondary battery includes a cathode containing the nickel-based active material for a lithium secondary battery.

Advantageous Effects of Disclosure

A nickel-based active material precursor for a lithium secondary battery according to an example embodiment has a density gradient from a core to a shell, and thus resistance to lithium diffusion is reduced. By using a cathode including a nickel-based active material obtained from the nickel-based active material precursor, a lithium secondary battery having increased discharge capacity and improved charge/discharge efficiency may be manufactured.

REFERENCE NUMERALS

| 10: Core | 11: Intermediate layer |
|---|---|
| 12: Shell | |
| 21: Lithium secondary battery | 22: negative electrode |
| 23: Positive electrode | 24: Separator |
| 25: Battery case | 26: Cap assembly |

Mode of Disclosure

Hereinafter, a nickel-based active material precursor for a lithium secondary battery, a method for producing the same, and a lithium secondary battery including a cathode containing the nickel-based active material precursor according to the present disclosure will be described in detail with reference to the accompanying drawings.

Figure 1A:
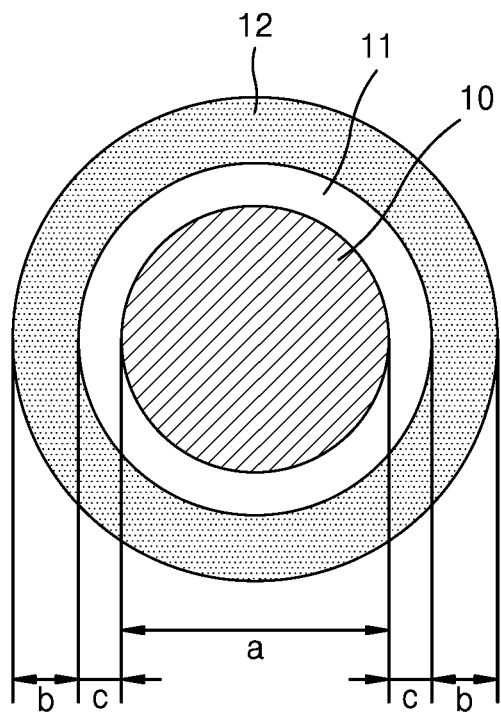
FIG. 1A schematically illustrates a structure of a nickel-based active material precursor according to an example embodiment.
Figure 1B:
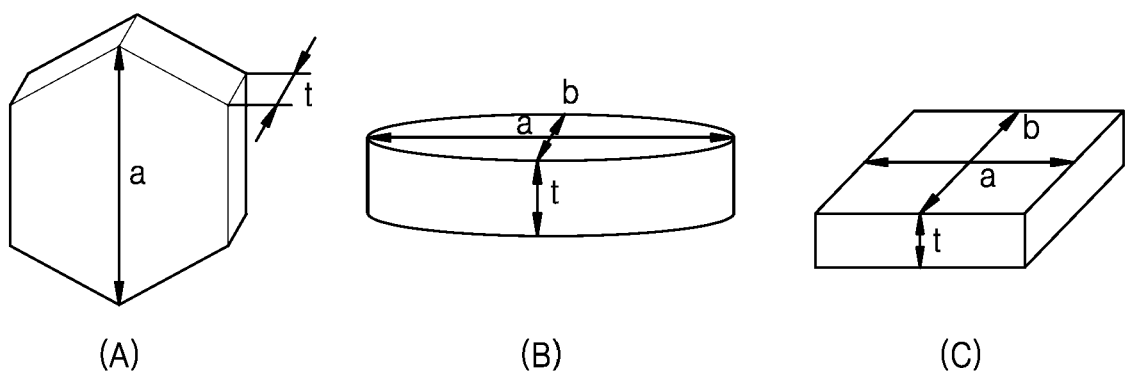
FIG. 1B is a schematic diagram illustrating shapes of plate particles.
Figure 1C:
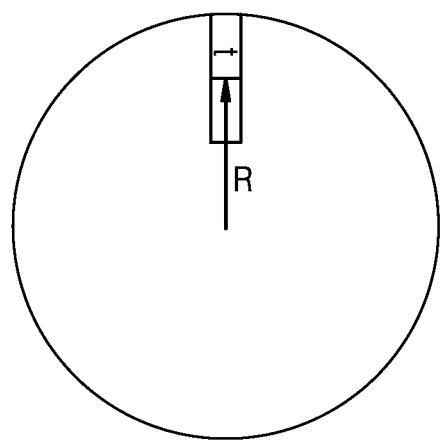
FIG. 1C is a diagram for describing the definition of a radial arrangement in a secondary particle of a nickel-based active material according to an example embodiment.

Hereinafter, a precursor according to an example embodiment of the present disclosure will be described with reference to FIGS. 1A to 1C. FIG. 1A schematically illustrates a structure of a nickel-based active material precursor according to an example embodiment. FIG. 1B is a schematic diagram illustrating shapes of plate particles. FIG. 1C is a diagram for describing definition of radial arrangement in a secondary particle of a nickel-based active material according to an example embodiment.

Referring to FIG. 1A, a nickel-based active material precursor according to the embodiment has a structure in which a core 10, an intermediate layer 11, and a shell 12 are sequentially stacked. Porosity gradually decreases from the core 10 toward the shell 12, and density gradually increases in the order of the core 10, the intermediate layer 11, and the shell 12. The nickel-based active material precursor according to the embodiment has porosity gradually decreasing from an inner portion to an outer portion. Thus, when an active material is prepared using the precursor, stress generated by volume changes caused during charging and discharging may be absorbed by the inside and breakage of the active material is reduced, thereby improving a lifespan of a battery.

Throughout the specification, the term "porosity" refers to a ratio of an area occupied by pores to a total area.

Because the nickel-based active material precursor according to the embodiment has a density gradient, a surface area where diffusion of lithium occurs increases and diffusion of lithium is facilitated. In addition, because open pores are well developed on the surface, an electrolyte may easily permeate therethrough facilitating diffusion of lithium. Also, because the core of the nickel-based active material precursor has a radial arrangement structure, stress may be reduced during charging and discharging. The core 10 may occupy an area a of 65 to 85% in length from the center based on a total length from the center to the surface. For example, the core 10 may have an area other than an area within 2 μm in thickness from the outermost boundary of the nickel-based active material precursor.

The core 10 may have a porosity of 15 to 20%. A pores size of the core 10 may be greater than that of the shell 12 and may be in a range of 150 nm to 1 μm, for example, 150 nm to 550 nm, for example, 200 nm to 500 nm. When the pore size of the core of the secondary particles is greater than that of the shell, a lithium diffusion distance is shorter than that of core where the pore size is equal to the pore size of the shell and the pores may reduce volume changes caused during charging and discharging without being exposed to an electrolytic solution. Throughout the specification, the term "pore size" refers to an average diameter of pores when the pores are spherical or circular. When the pore has an oval shape, or the like, the pore size refers to an average length of a major axis of the pore.

The core 10 may have an irregular porous structure. The term "irregular porous structure" refers to a structure including pores with irregular or non-uniform sizes and shapes. The core 10 may include plate particles which may irregularly be arranged. Referring to FIG. 1B, a plate particle may have a polygonal nanoplate shape such as a hexagonal plate shape (A), a nanodisc shape (B), and a rectangular parallelepiped shape (C). The term "plate particle" refers to a particle having a thickness smaller than a length of a major axis (a plane direction). The length of the major axis refers to a maximum length of the widest plane of the plate particle. That is, in FIG. 1B, a thickness t of the plate particle is smaller than lengths a and b in the plane direction. The length a in the plane direction may be the same as or greater than the length b in the plane direction. A direction in which the thickness t of the plate particle is defined is referred to as a thickness direction, and a direction including the lengths a and b is referred to as a plane direction. The plate particle has an average length of 150 to 500 nm, for example, 200 to 380 nm, particularly, 290 to 360 nm. The average length refers to an average of a major axial length and a minor axal length of the plate particle in the plane direction. The average thickness of the plate particle is in a range of 100 to 200 nm, for example 120 to 180 nm, particularly 130 to 150 nm. In addition, a ratio of the average thickness to the average length is in a range of 1:2 to 1:5, for example 1:2.1 to 1:5, particularly 1:2.3 to 1:2.9. When the average length, the average thickness, and the ratio of the average thickness to the average length satisfy the above-described ranges, relatively many lithium diffusion paths are formed between grain boundaries of particles and many crystal planes enabling transfer of lithium to the shell are exposed on the surface, and thus a degree of lithium diffusion increases, thereby improving initial efficiency and capacity.

The major axis of the plate particle may be arranged in a radial direction. In this case, a crystal plane (plane perpendicular to crystal plane (001)) through which lithium passes is exposed on the surface of a secondary particle. As used herein, the term "radial(ly)" as used herein means that a direction of the thickness t of a plate may be arranged in a direction perpendicular to or within ±5° of a direction perpendicular to a direction R toward a center of the secondary particle as shown in FIG. 1C. When primary particles are radially arranged, the pores exposed on surfaces therebetween may be toward a central direction, thereby facilitating lithium diffusion from the surfaces. Upon deintercalation of lithium, pores may be present near a (001) crystal plane direction, i.e., a direction in which particles may expand, such that buffering action is enabled. Since the size of each of plate primary particles is small, cracks may be less likely to be formed upon shrinkage and expansion. The internal pores of the core may additionally ease volumetric change, and thus cracks between the primary particles may be less likely to be formed upon charge/discharge, thereby improving lifespan characteristics and reducing an increase in resistance.

The shell (outer) 12 refers to an area b of 5 to 15% by length from the outermost surface or an area within 2 μm from the outermost surface of the nickel-based active material precursor, based on a total distance from the center to the surface of the nickel-based active material precursor as shown in FIG. 1A.

The shell 12 has a porosity of, for example, 2% or less, for example, 0.1 to 2%. The shell 12 may have a pore size of less than 150 nm, for example, 100 nm or less, for example, 20 to 90 nm. The shell 12 may include plate particles like the core 10 as described above, and the plate particles may have a radial arrangement.

The intermediate layer 11 is an area c other than the core 10 and the shell 12. The intermediate layer 11 may have a porosity of 10 to 15%. In some embodiments, the intermediate layer 11 may have a porosity of 10 to 14.8%.

The nickel-based active material precursor according to the embodiment may have a specific surface area of 4 to 10 $m^2/g$. Due to such a large specific surface area of the nickel-based active material precursor, diffusion of lithium may be performed more easily.

The nickel-based active material precursor according to the embodiment is a compound represented by Formula 1 below.

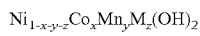

$$Ni_{1-x-y-z}Co_xMn_yM_z(OH)_2$$

In Formula 1, M is an element selected from the group consisting of boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and $x \leq (1-x-y-z)$, $y \leq (1-x-y-z)$, $0 < x < 1$, $0 \leq y < 1$, and $0 \leq z < 1$ are satisfied. In Formula 1, $0 < x \leq 0.33$, $0 \leq y \leq 0.5$, $0 \leq z \leq 0.05$, and $0.33 \leq (1-x-y-z) \leq 0.95$ are satisfied. According to another example embodiment, $0 \leq z \leq 0.05$, $0 < x \leq 0.33$, and $0 \leq y \leq 0.33$ are satisfied in Formula 1. According to an example embodiment, z is 0 in Formula 1. According to another example embodiment, when $0 < z \leq 0.05$ is satisfied in Formula 1, M may be aluminum. A metal hydroxide of Formula 1 may be, for example, $Ni_{0.6}Co_{0.2}Mn_{0.2}(OH)_2$, $Ni_{0.5}Co_{0.2}Mn_{0.3}(OH)_2$, $Ni_{0.33}Co_{0.33}Mn_{0.33}(OH)_2$, or $Ni_{0.8}Co_{0.1}Mn_{0.1}(OH)_2$.

A size of the nickel-based active material precursor according to the embodiment is in a range of 5 to 25 μm. When the size of the secondary particle of the nickel-based active material precursor is within this range, lithium ions may easily be used.

Hereinafter, a method of producing a nickel-based active material precursor according to an embodiment will be described.

The nickel-based active material precursor is prepared to have excellent structural stability by appropriately maintaining pores formed by the crystal planes (001) while minimizing exposure of the crystal planes (001). In addition, the center of the nickel-based active material precursor has a radial arrangement structure and the length of lithium diffusion is efficiently controlled by this structure.

The method of producing the nickel-based active material precursor according to an embodiment may be divided into a first process, a second process, and a third process according structure-forming processes for the core, the intermediate layer, and the shell. In the first process, the second process, and the third process, processing conditions such as concentration and amount of a metal raw material and concentration and amount of ammonia water as a complexing agent may vary.

In the first process, a complexing agent, a pH regulator, and a metal raw material forming a nickel-based active material precursor are mixed and reacted to form a core of the nickel-based active material precursor. According to an embodiment, the first process is performed by adding the complexing agent and the pH regulator to a reactor and then adding the metal raw material thereto to perform the reaction. When the pH of the reaction mixture is changed as the reaction proceeds, the pH regulator may further be added thereto, if required, to adjust the pH of the reaction mixture within a predetermined range.

Subsequently, the second process is performed to form the intermediate layer on the core obtained in the first process, and then the third process is performed to form the shell on the intermediate layer obtained in the second process.

Stirring powers of the second process and the third process are reduced when compared with a stirring power of the first process. The stirring powers of the second process and the third process may be the same. The stirring power of each process is in a range of 0.1 to 6 KW/m², for example 1 to 3 KW/m².

The pH of each of the first process, the second process, and the third process is controlled in a range of 10 to 12.

In the above-described method of producing the nickel-based active material precursor, the concentration of the complexing agent gradually increases in the order of the first process, the second process, and the third process. The concentration of the complexing agent may be in a range of 0.1 to 0.7 M. As the complexing agent, for example, ammonia water is used.

In the first process, the core which is the center of the particle is formed by adding the raw material while maintaining the pH of the reaction mixture. In the second process, after maintaining a product obtained from the first process for a predetermined time, the amounts and concentrations of the metal raw material and the complexing agent are increased to prevent a decrease in growth rates of the particles caused in accordance with the growth of particles.

Subsequently, after maintaining a reaction product obtained from the second process for a predetermined time, the amounts and concentrations of the metal raw material and the complexing agent are increased to prevent a decrease in growth rates of the particles caused in accordance with the growth of particles. The porosity of internal portion of the nickel-based active material precursor particle is determined according to a time of each process described above.

In the nickel-based active material precursor according to an embodiment, the porous core structure is influenced by the amount of the metal raw material, the concentration of the complexing agent, and the pH of the reaction mixture.

The pH regulator serves to form a precipitate from the reaction mixture by adjusting the pH of the reaction mixture. Examples of the pH regulator are sodium hydroxide (NaOH), sodium carbonate ($Na_2CO_3$), and sodium oxalate ($Na_2C_2O_4$). As the pH regulator, for example, sodium hydroxide (NaOH) is used.

The complexing agent adjusts a reaction rate of forming a precipitate in coprecipitation reaction and may be ammonium hydroxide ($NH_4OH$) (ammonia water), citric acid, and the like. The complexing agent may be used in any amount commonly used in the art. As the complexing agent, for example, ammonia water is used.

The concentration of the complexing agent may be in a range of 0.1 to 0.7 M, for example, about 0.2 to about 0.5 M. In addition, the concentration of the metal raw material is in a range of 0.1 to 0.5 M, for example, 0.3 M.

The amount of the metal raw material may be in a range of 50 to 100 ml/min in the first process.

In the first process, the core of the nickel-based active material is formed.

Subsequently, the second process of adding the metal raw material and the complexing agent to a resultant reaction product of the first process, adjusting the pH of the reaction mixture, and then proceeding a reaction of the reaction mixture is performed.

In the second process, the concentration of the complexing agent is in a range of, for example, 0.3 to 1.0 M. In the second process, the amount of the metal raw material is in a range of 90 to 120 ml/min, and the amount of the complexing agent is in a range of 8 to 12 ml/min.

The third process of adding the metal raw material and the complexing agent to a resultant reaction product of the second process, adjusting the pH of the reaction mixture, and proceeding a reaction of the reaction mixture is performed to prepare the nickel-based active material precursor.

In the third process, the concentration of the complexing agent may be in a range of 0.35 to 1.0 M.

The reaction conditions of the third process considerably influence a surface depth of a porous layer of the nickel-based active material precursor.

In the third process, the amount of the metal raw material is in a range of 120 to 150 ml/min, and the amount of the complexing agent is in a range of 12 to 18 ml/min.

In the preparation process, as the metal raw material, a metal precursor is used in consideration of the composition of the nickel-based active material precursor. The metal raw material may be metal carbonate, metal sulfate, metal nitrate, metal chloride, and the like.

To prepare the compound represented by Formula 1, a manganese precursor, a nickel precursor, and a cobalt precursor may be used as the metal raw material. The manganese precursor, the nickel precursor, and the cobalt precursor may be, for example, manganese sulfate, nickel sulfate, cobalt sulfate, manganese chloride, nickel chloride, and cobalt chloride.

Hereinafter, a method of producing a nickel-based active material according to an embodiment will be described.

A lithium precursor and the nickel-based active material precursor according to an embodiment are mixed in a certain molar ratio and then subjected to a low-temperature heat treatment at 600 to 800° C. to prepare a nickel-based active material.

The lithium precursor may be, for example lithium hydroxide, lithium fluoride, lithium carbonate, or any mixture thereof. A mixing ratio of the lithium precursor and the nickel-based active material precursor is adjusted stoichiometrically to prepare a nickel-based active material having a desired composition.

The mixing may be performed by dry mixing or by using a mixer.

The low-temperature heat treatment is performed in an oxidizing gas atmosphere. The oxidizing gas atmosphere is performed using an oxidizing gas such as oxygen or air, and the oxidizing gas may include, for example, 10 to 20 vol % of oxygen or air and 80 to 90 vol % of an inert gas.

The heat treatment may be performed at a temperature where reactions of the lithium precursor and the nickel-based active material precursor proceed and at a densification temperature or less than a densification temperature. In this regard, the densification temperature refers to a temperature at which crystallization is sufficiently performed to realize a charge capacity obtained by an active material.

The heat treatment is performed, for example, at 600 to 800° C., for example, at 700 to 800° C.

A heat treatment time vary according to the temperature of the low-temperature heat treatment, or the like, but may be, for example, from 3 to 10 hours.

When the heat treatment is performed under the above-described conditions, primary particles of a nickel-based active material including a shell having a radial arrangement structure and a core having an irregular porous structure may be prepared. An average particle diameter of the primary particles of the nickel-based active material may be in a range of 100 to 250 nm in a minor axis direction. Due to such an average particle diameter, stress caused by volume changes during charging and discharging may be suppressed.

Secondary particles of the nickel-based active material may be subjected to a second heat treatment (high-temperature heat treatment, high-temperature sintering) in an oxidizing gas atmosphere while inhibiting the gases from being exhausted.

By inhibiting the gases from being exhausted in the preparation of the secondary particles of the nickel-based active material, the atmosphere inside the reactor may be maintained as much as possible, and thus generation of a resistive layer of the secondary particles of the nickel-based active material is inhibited and particle densification may be performed.

The high-temperature heat treatment is performed, for example, at 700 to 900° C. A high-temperature heat treatment time may vary according to the temperature of the high-temperature heat treatment, and the like, but may be, for example, in a range of 3 to 10 hours. An average particle diameter of the secondary particles of the nickel-based active material is in a range of 2 to 18 μm, for example, 3 to 12 μm. In the high-temperature heat treatment of the primary particles of the nickel-based active material, a hetero-element compound including at least one selected from zirconium (Zr), titanium (Ti), aluminum (Al), magnesium (Mg), tungsten (W), phosphorus (P), and boron (B) may further be added thereto.

Examples of the hetero-element compound including at least one selected from zirconium (Zr), titanium (Ti), aluminum (Al), magnesium (Mg), tungsten (W), phosphorus (P), and boron (B) may include titanium oxide, zirconium oxide, aluminum oxide, and the like. The hetero-element compound may include both of lithium (Li) and a hetero-element. The hetero-element compound may be, for example, i) an oxide of at least one selected from i) zirconium (Zr), titanium (Ti), aluminum (Al), magnesium (Mg), tungsten (W), phosphorus (P), and boron (B) or ii) an oxide including lithium and at least one selected from zirconium (Zr), titanium (Ti), aluminum (Al), magnesium (Mg), tungsten (W), phosphorus (P), and boron (B).

The hetero-element compound may be, for example, $ZrO_2$, $Al_2O_3$, $LiAlO_2$, $Li_2TiO_3$, $Li_2ZrO_3$, $LiBO_3$, and $Li_3PO_4$.

An amount of the compound including the above-described hetero-element may be in a range of 0.0005 to 0.01 parts by weight based on 100 parts by weight of the secondary particles of the nickel-based active material. The existence and distribution of the oxide including the hetero-element may be identified by Electron Probe Micro-Analysis (EPMA).

According to an example embodiment, the nickel-based active material may be, for example, a compound represented by Formula 2 below.

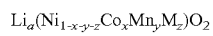

$$Li_a(Ni_{1-x-y-z}Co_xMn_yM_z)O_2 \qquad \text{Formula 2}$$

In Formula 2, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and $0.95 \leq a \leq 1.3$, $x \leq (1-x-y-z)$, $y \leq (1-x-y-z)$, $0 < x < 1$, $0 \leq y < 1$ and $0 \leq z < 1$ are satisfied. As described above, in the nickel-based active material of Formula 1, an amount of Ni is greater than that of Co, and the amount of Ni is greater than that of Mn.

In Formula 2, $0.95 \leq a \leq 1.3$, for example, $1.0 \leq a \leq 1.1$, $0 < x \leq 1/3$, for example, $0.1 \leq x \leq 1/3$, $0 \leq y \leq 0.5$, for example, $0.05 \leq y \leq 0.3$, $0 \leq z \leq 0.05$, and $1/3 \leq (1-x-y-z) \leq 0.95$ are satisfied. For example, in Formula 2, $1/3 \leq (1-x-y-z) \leq 0.95$ is satisfied.

According to another example embodiment, in Formula 2, $0 \leq z \leq 0.05$, $0 < x \leq 1/3$, and $0 \leq y \leq 1/3$ are satisfied, and z is 0.

According to another example embodiment, when $0 < z \leq 0.05$ is satisfied in Formula 2, M may be aluminum.

In the nickel-based active material, the amount of Ni is in a range of 1/3 to 0.95 mol %, which is greater than that of each of Mn and Co, based on the total amount of transition metals (Ni, Co, and Mn).

In the nickel-based active material, the amount of Ni is greater than each of the other transition metals based on 1 mole of the transition metals. By using the nickel-based active material having such a high Ni content, the degree of lithium diffusion increases, conductivity increases, and higher capacity may be obtained at the same voltage in a lithium secondary battery including a cathode containing the nickel-based active material. However, lifespan characteristics may deteriorate due to occurrence of cracks.

The nickel-based active material is $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

The overall porosity of the nickel-based active material is in a range of 1 to 8%, for example, 1.5 to 7.3%. A porosity of the outer portion of the nickel-based active material is less than that of the inner portion. Pores exposed on the surface arranged toward the center, and sizes of the pores are 150 nm less, for example, in a range of 10 to 100 nm when viewed from the surface. The porosity of the inner portion is in a range of 2 to 20%, and a closed porosity of the outer portion is in a range of 0.1 to 2%. The term "closed porosity" refers to a fraction of closed pores (pores into which an electrolytic solution cannot permeate) with respect to a total volume of pores.

In the nickel-based active material according to an example embodiment, the porosity of the inner portion (pore fraction) is in a range of 3.3 to 16.5% and the porosity of the outer portion (pore fraction) is in a range of 0.3 to 0.7%.

By including radial plate particles, the nickel-based active material according to an example embodiment may assist diffusion of lithium and suppress stress caused by volume changes during charging and discharging, thereby inhibiting occurrence of cracks. Also, the radial plate particles may increase an active surface area required for lithium diffusion by reducing a surface resistive layer and increasing lithium diffusion directions on the surface during the manufacture. In the nickel-based active material according to another example embodiment, the outer portion includes plate particles whose major axes are aligned in a radial direction and the inner portion includes short, flat plate particles having a length of 150 nm to 200 nm, for example, nanodisc shaped particles.

The nickel-based active material according to an example embodiment includes radial plate particles and non-radial plate particles. An amount of the non-radial plate particle may be 20 wt % or less, for example, in a range of 0.01 to 10 wt %, particularly, 0.1 to 5 wt %, based on 100 parts by weight of a total weight of the radial plate particles and the non-radial plate particles. When the nickel-based active material includes the non-radial particles within the ranges above in addition to the radial plate particles, diffusion of lithium is efficiently performed and a lithium secondary battery having improved lifespan characteristics may be manufactured.

In the nickel-based active material according to an example embodiment, the core may have a pore size of 150 nm to 550 μm, and the shell may have a pores size of less than 150 nm. The core of the nickel-based active material may have closed pores, and the shell may have closed pores and/or open pores. Closed pores are difficult to contain an electrolyte, whereas open pores may contain the electrolyte in the pores of the core. Throughout the specification, a closed pore refers to an independent pore having a closed wall structure without being connected to another pore and an open pore refers to a continuous pore having a wall structure, at least one portion of which is open, and connected to the shell of the particle.

The secondary particle has open pores having a size of less than 150 nm toward at a central area of the core.

When the active material is discharged, a diffusion rate of lithium decreases at the end of discharging and large-sized secondary particles of the nickel-based active material increase resistance to permeation of lithium into the cores of the secondary particles of the nickel-based active material, and thus discharge capacity decreases in comparison with charge capacity, thereby deteriorating charge/discharge efficiency. However, in the secondary particle of the nickel-based active material according to an example embodiment, the porous core structure may reduce a diffusion distance to the core and the shell radially aligned toward the surface may facilitate intercalation of lithium into the surface. In addition, due to small-sized primary particles of the nickel-based active material, lithium transfer paths may be easily secured among crystal grains. Also, because the primary particles have small sizes and pores between the primary particles buffer volume changes caused during charging and discharging, stress caused by volumes changes during charging and discharged may be minimized.

The secondary particle of the nickel-based active material precursor according to an example embodiment may have open pores toward the center of the core with a size of less than 150 nm, for example 25 to 148 nm. The open pore is an exposed pore through which an electrolyte flows. According to an example embodiment, the open pore is formed to a depth of less than 150 nm, for example, 0.001 to 1000 nm, for example 1 to 50 nm, on average, from the surface of the secondary particle of the nickel-based active material.

C-planes of the primary particles of the nickel-based active material according to an example embodiment are aligned in the radial direction.

According to another embodiment, a lithium secondary battery including a cathode containing the nickel-based active material, an anode, and an electrolyte interposed therebetween is provided. A method of producing the lithium secondary battery will be described later.

The lithium secondary battery according to an example embodiment may further include a separator in addition to the electrolyte.

The cathode and the anode are prepared by coating a cathode active material layer-forming composition and an anode active material layer-forming composition on current collectors and drying the coated compositions, respectively.

The cathode active material layer-forming composition is prepared by mixing a cathode active material, a conductive agent, a binder, and a solvent, and the cathode active material according to an example embodiment is used as the cathode active material.

The binder, as a component assisting binding of the active material to the conductive agent and to the current collector, may be added thereto in an amount of 1 to 50 parts by weight based on 100 parts by weight of a total weight of the cathode active material. Examples of the binder may include, but are not limited to, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluoride rubber, and various copolymers. An amount of the binder may be in a range of 2 to 5 parts by weight based on 100 parts by weight of the total weight of the cathode active material. When the amount of the binder is within the range above, a high binding force of the active material to the current collector is obtained.

The conductive agent may be any material that does not cause any chemical change in a battery and has conductivity, without limitation. For example, the conductive agent may be: graphite such as natural graphite and artificial graphite; a carbonaceous material such as carbon black, acetylene black, ketjen black, channel black, furnace black, lamp black, and thermal black; conductive fiber such as carbon fiber and metal fiber; carbon fluoride; metal powder such as aluminum powder and nickel powder; conductive whisker such as zinc oxide and potassium titanate; conductive metal oxide such as titanium oxide; and conductive materials such as polyphenylene derivatives.

An amount of the conductive agent may be in a range of 2 to 5 parts by weight based on 100 parts by weight of the total weight of the cathode active material. When the amount of the conductive agent is within the range above, a finally obtained electrode has excellent conductivity.

Examples of the solvent may include, but are not limited to, N-methylpyrrolidone.

An amount of the solvent may be in a range of 1 to 10 parts by weight based on 100 parts by weight of the cathode active material. When the amount of the solvent is within the range above, a process of forming the active material layer may efficiently be performed.

The cathode current collector may be any material having a thickness of 3 to 500 μm and high conductivity and not causing any chemical change in a battery without limitation. Examples of the cathode current collector may include stainless steel, aluminum, nickel, titanium, heat-treated carbon, or aluminum or stainless-steel surface-treated with carbon, nickel, titanium, silver, or the like. The current collector may have a surface on which irregularities are formed to enhance adhesive force of the cathode active material and may be used in any of various forms including films, sheets, foils, nets, porous structures, foams, and non-woven fabrics.

Separately, an anode active material, a binder, a conductive agent, and a solvent are mixed to prepare an anode active material layer-forming composition Examples of the anode active material include, but are not limited to, a carbonaceous material such as graphite and carbon, lithium metal, an alloy thereof, and a silicon oxide-based material. According to an example embodiment of the present disclosure, silicon oxide is used.

The binder is added thereto in an amount of 1 to 50 parts by weight based on 100 parts by weight of a total weight of the anode active material. The binder may be the same type as that of the cathode, without limitation.

The conductive agent is used in an amount of 1 to 5 parts by weight based on 100 parts by weight of the total weight of the anode active material. When the amount of the conductive agent is within this range, a finally obtained electrode has excellent conductivity.

The solvent is used in an amount of 1 to 10 parts by weight based on 100 parts by weight of the total weight of the anode active material. When the amount of the solvent is within this range, a process of forming an anode active material layer is easily performed.

The conductive agent and the solvent may be the same types as those used in preparing the cathode.

The anode current collector is generally formed to have a thickness of 3 to 500 μm. The anode current collector may be any conductive material not causing any chemical change in a battery without limitation. Examples of the anode current collector may include, but are not limited to, copper, stainless steel, aluminum, nickel, titanium, heat-treated carbon, copper or stainless-steel surface-treated with carbon, nickel, titanium, silver, or the like, or an aluminum-cadmium alloy. In addition, like the cathode current collector, the anode current collector may have a surface on which irregularities are formed to enhance adhesive force of the anode active material and may be used in any of various forms including films, sheets, foils, nets, porous structures, foams, and non-woven fabrics.

The separator is interposed between the cathode and the anode each prepared according to the above-described process.

The separator may have a pore diameter of 0.01 to 10 μm and a thickness of 5 to 300 μm. Particularly, examples of the separator include: an olefin-based polymer such as polypropylene and polyethylene; or a sheet or non-woven fabric formed of glass fibers. When a solid electrolyte such as a polymer is used as the electrolyte, the solid electrolyte may also serve as a separator.

A lithium salt-containing non-aqueous electrolyte is formed of a non-aqueous electrolytic solution and lithium. A non-aqueous electrolyte may be a non-aqueous electrolytic solution, an organic solid electrolyte, an inorganic electrolyte, and the like.

Examples of the non-aqueous electrolytic solution may include, but are not limited to, any aprotic organic solvent such as N-methyl pyrrolidinone, propylene carbonate, ethylene carbonate, butylene carbonate, dimethyl carbonate, diethyl carbonate, gamma-butyro lactone, 1,2-dimethoxy ethane, 2-methyl tetrahydrofuran, dimethylsulfoxide, 1,3-dioxolane, N,N-formamide, N,N-dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include, but are not limited to, polyethylene derivatives, polyethylene oxide derivatives, polypropylene oxide derivatives, phosphoric acid ester polymers, polyvinyl alcohol, and polyvinylidene fluoride.

Examples of the inorganic solid electrolyte include, but are not limited to, $Li_3N$, $LiI$, $Li_5NI_2$, $Li_3N$—$LiI$—$LiOH$, $Li_2SiS_3$, $Li_4SiO_4$, $Li_4SiO_4$-$LiI$—$LiOH$, and $Li_3PO_4$—$Li_2S$—$SiS_2$.

The lithium salt may be a material easily dissolved in the non-aqueous electrolyte, for example, but is not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, lithium chloroborate, lower aliphatic lithium carboxylate, and lithium tetraphenyl borate.

Figure 2:
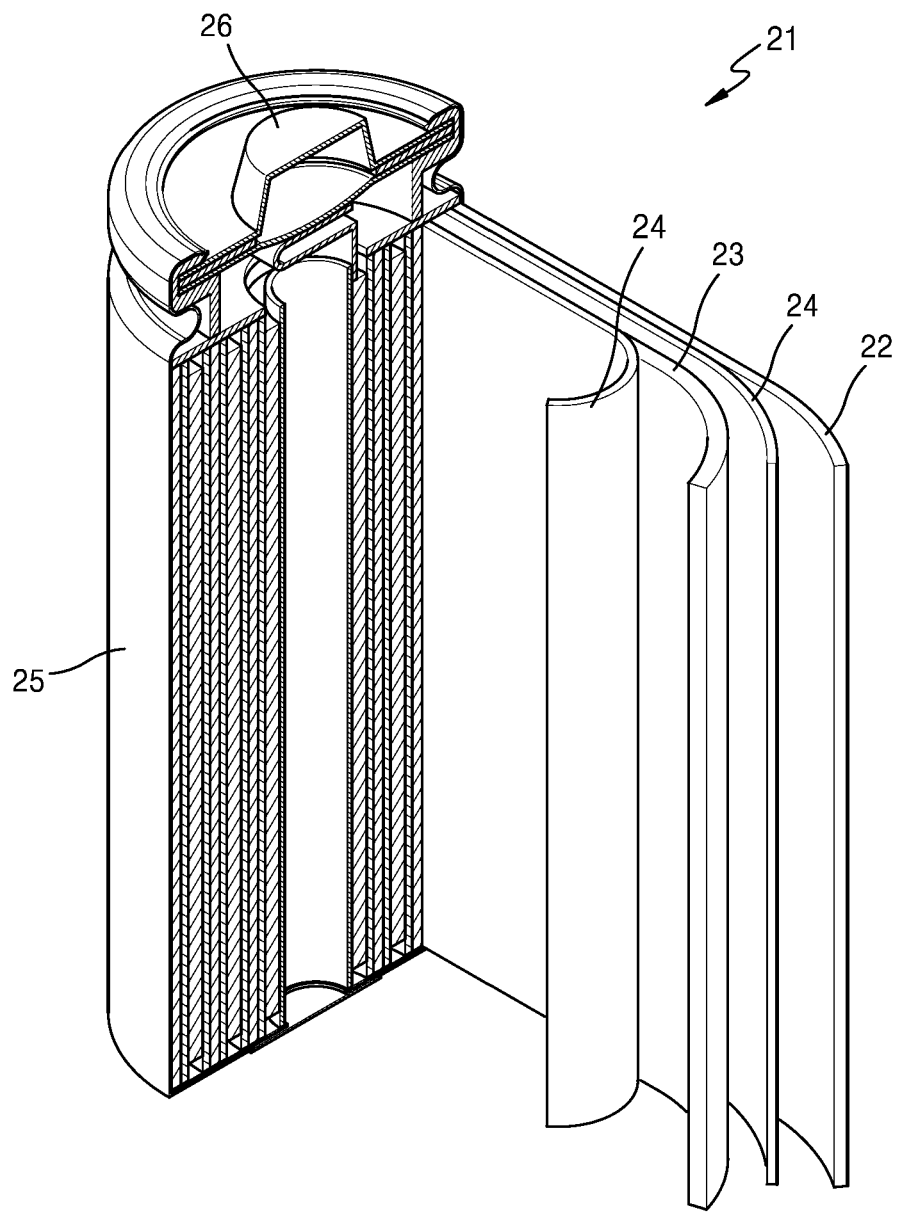
FIG. 2 schematically illustrates a structure of a lithium secondary battery according to an example embodiment.

FIG. 2 is a cross-sectional view schematically illustrating a representative structure of a lithium secondary battery according to an embodiment.

Referring to FIG. 2, a lithium secondary battery 21 includes a cathode 23, an anode 22, and a separator 24. The cathode 23, the anode 22, and the separator 24 are wound or folded, and then accommodated in a battery case 25. Subsequently, an organic electrolyte is injected into the battery case 25, and the battery case 25 is sealed with a cap assembly 26, thereby completing the manufacture of the lithium secondary battery 21. The battery case 25 may have a cylindrical, rectangular, or thin-film shape. For example, the lithium secondary battery 21 may be a large-sized thin-film battery. The lithium secondary battery may be a lithium ion battery. The separator is interposed between the cathode and the anode to form a battery assembly. After the battery assembly is stacked in a bi-cell structure and impregnated with the organic electrolyte, the obtained resultant is accommodated in a pouch, thereby completing the manufacture of a lithium ion polymer battery. In addition, a plurality of battery assemblies may be stacked to form a battery pack, which may be used in any device that requires high capacity and high output. For example, the battery pack may be used in notebook computers, smart phones, and electric vehicles.

Also, the lithium secondary battery may be used in electric vehicles (EVs) due to excellent storage stability at high temperature, lifespan characteristics, and high-rate characteristics. For example, the lithium secondary battery may be used in hybrid vehicles such as plug-in hybrid electric vehicles (PHEVs).

Hereinafter, the present disclosure will be described in more detail with reference to the following examples and comparative examples. However, the following examples and comparative examples are merely presented to exemplify the present disclosure, and the scope of the present disclosure is not limited thereto.

In the following examples, $NH_3$ is ammonia water.

Example 1

A nickel-based active material precursor ($Ni_{0.6}Co_{0.2}Mn_{0.2}OH$) was synthesized according to a co-precipitation method described below. As a metal raw material forming the nickel-based active material precursor in the following manufacturing process, nickel sulfate, cobalt sulfate, and manganese sulfate were used.

[First process: 1.5 kW/m$^3$, 0.30 M of $NH_3$, pH of 10 to 11, and reaction time of 6 hours]

First, ammonia water having a concentration of 0.30 M was added to a reactor. Reaction was initiated while adding a metal raw material and a complexing agent at respective speeds of 90 ml/min and 10 ml/min at a stirring power of 1.5 kW/m$^3$ at a reaction temperature of 50° C.

The reaction was continued for 6 hours while adding NaOH thereto to maintain the pH. After identifying that an average particle size of the core particle obtained as a result of the reaction was in a range of about 5.5 to about 6.5 μm, a second process was carried out as follows.

[Second process: 1.0 kW/m$^3$, 0.35 M of $NH_3$, pH of 10 to 11, and reaction time of 6 hours]

The metal raw material and the complexing agent were added to the reactor at respective speeds of 100 ml/min and 15 ml/min while maintaining the reaction temperature of 50° C. such that the concentration of the complexing agent was maintained at 0.35 M. The reaction was continued for 6 hours while adding NaOH thereto to maintain the pH. In this case, the stirring power was 1.0 kW/m$^3$ which was lower than that of the first process. After identifying that an average particle size of a product including the core and an intermediate layer obtained as a result of the reaction was in a range of about 9 to about 10 μm, a third process was carried out as follows.

[Third process: 1.0 kW/m$^3$, 0.40 M of $NH_3$, pH of 10 to 11, and reaction time of 4 hours]

The metal raw material and the complexing agent were added to the reactor at respective speeds of 150 ml/min and 20 ml/min while maintaining the reaction temperature of 50° C. such that the concentration of the complexing agent was maintained at 0.40 M. The reaction was continued for 4 hours while adding NaOH thereto to maintain the pH. In this case, the stirring power was maintained at the same as that of the second process.

[Postprocess]

A postprocess was carried out by washing the reaction resultant and drying the washed resultant in a hot-air dryer at about 150° C. for 24 hours to obtain a nickel-based active material precursor.

Subsequently, the nickel-based active material precursor and LiOH were heat-treated in a molar ratio of 1:1 under the following conditions.

A first heat treatment was performed in an air atmosphere at about 800° C. for 6 hours. A second heat treatment was performed by heat-treating a product of the first heat treatment in an oxygen atmosphere at about 850° C. for 6 hours to obtain a nickel-based active material ($LiNi_{0.6}Co_{0.2}Mn_{0.2}O_2$).

Examples 2 and 3

Nickel-based active material precursors were prepared and nickel-based active materials were obtained therefrom in the same manner as in Example 1, except that the manufacturing process was changed such that the core, the intermediate layer, and the shell have porosity characteristics as shown in Table 4 below.

Comparative Example 1

A nickel-based active material precursor ($Ni_{0.48}Co_{0.26}Mn_{0.36}OH$) was synthesized according to a co-precipitation method described below. As a metal raw material forming the nickel-based active material precursor in the following manufacturing process, nickel sulfate, cobalt sulfate, and manganese sulfate were used.

[First process: 250 rpm, 0.50 M of $NH_3$, and pH of 11.40 to 11.60]

First, ammonia water having a concentration of 0.50 mol/L was added to a reactor. After initiating reaction at a stirring speed of 250 kW/m$^3$ and a reaction temperature of 50° C., the metal raw material and ammonia water were added thereto at 6.0 ml/min and at 1.35 ml/min, respectively. Subsequently, NaOH was added thereto to maintain the pH. In this case, the pH of the reactor was in a range of 11.4 to 11.60. Within the pH range, the reaction was performed for 33 hours.

A postprocess was carried out by washing the reaction resultant and drying the washed resultant in a hot-air dryer at about 150° C. for 24 hours to obtain a nickel-based active material precursor.

Subsequently, the nickel-based active material precursor and LiOH were heat-treated in a molar ratio of 1:1 under the following conditions.

A first heat treatment was performed in an air atmosphere at about 800° C. for 6 hours. A second heat treatment was performed by heat-treating a product of the first heat treatment in an oxygen atmosphere at about 850° C. for 6 hours to obtain a nickel-based active material ($LiNi_{0.6}Co_{0.2}Mn_{0.2}O_2$).

Comparative Example 2

Preparation of Nickel-based Active Material Precursor

A nickel-based active material precursor was prepared and a nickel-based active material was prepared therefrom in the same manner as in Example 1, except that the stirring power of the second process and the third process was 1.5 kW/m$^2$, the stirring power of the first process was 1.0 kW/m², and the concentrations of ammonia water were gradually reduced in the order of the first process, the second process, and the third process.

It was difficult to obtain the nickel-based active material precursor having a structure in which porosity gradually decreases in the order of the core, the intermediate layer, and the shell according to Comparative Example 2.

Preparation Example 1

Coin Half Cell

A coin half cell was prepared according to the following method by using secondary particles of the nickel-based active material ($LiNi_{0.6}Co_{0.2}Mn_{0.2}O_2$) obtained according to Example 1 as a cathode active material.

96 g of the secondary particles of the nickel-based active material ($LiNi_{0.6}Co_{0.2}Mn_{0.2}O_2$) obtained according to Example 1, 2 g of polyvinylidene fluoride, 47 g of N-methyl pyrrolidone as a solvent, and 2 g of carbon black as a conductive agent were mixed using a mixer while removing air bubbles therefrom to prepare an uniformly dispersed cathode active material layer-forming slurry.

The slurry prepared according to the process was coated on an aluminum foil by using a doctor blade to form a thin electrode plate. The electrode plate was dried at 135° C. for 3 hours or more, followed by rolling and vacuum drying to prepare a cathode.

A 2032 type coin half cell (coin cell) was prepared by using the cathode and a lithium metal as a counter electrode. A separator (thickness: about 16 μm) formed of a porous polyethylene (PE) film was interposed between the cathode and the lithium metal counter electrode and an electrolyte was injected thereinto, thereby preparing a 2032 type coin half cell.

In this regard, 1.1 M of a $LiPF_6$ solution prepared by dissolving $LiPF_6$ in a mixed solvent including ethylene carbonate (EC) and ethylmethyl carbonate (EMC) in a volume ratio of 3:5 was used as the electrolyte.

Preparation Examples 2 and 3

Preparation of Coin Half Cell

Coin half cells were prepared in the same manner as in Preparation Example 1, except that the nickel-based active materials respectively prepared according to Examples 2 and 3 were used instead of the nickel-based active material prepared according to Example 1.

Comparative Manufacture Examples 1 and 2

Preparation of Coin Half Cell

Lithium secondary batteries were prepared in the same manner as in Preparation Example 1, except that the nickel-based active materials respectively prepared according to Comparative Examples 1 and 2 were used instead of the nickel-based active material prepared according to Example 1.

Evaluation Example 1

Particle Size Analysis

Particle sizes of the nickel-based active material precursor prepared according to Example 1 and Comparative Example 1 were analyzed. Particle size analysis results are shown in Table 1 below. In Table 1, D10, D50, and D90 respectively refer to cumulative particle diameters at 10%, 50%, and 90% of a total cumulative particle diameter distribution of particles from the smallest particle diameter.

TABLE 1

| Example | D10 | D50 | D90 |
| --- | --- | --- | --- |
| Example 1 | 8.61 | 11.57 | 14.90 |
| Comparative Example 1 | 10.35 | 11.99 | 13.70 |

Evaluation Example 2

Specific Surface Area and Composition Analysis

Compositions and specific surface areas of the nickel-based active material precursors prepared according to Example 1 and Comparative Example 1 were analyzed and shown in Table 2 below. The compositions were analyzed by Inductively Coupled Plasma (ICP) analysis and the specific surface areas were evaluated by using a Brunauer, Emmett and Teller (BET) method.

In Table 2 below, particle sizes after 1 hour of reaction may be quantified by measuring a layer of the nickel-based active material precursor in which pores are formed. Scanning electron microscope (SEM) images of cross-sections may be used therefor.

TABLE 2

| Item | | Example 1 | Comparative Example 1 |
| --- | --- | --- | --- |
| Composition ratio | Ni | 60.620 | 60.7 |
| | Co | 19.870 | 19.7 |
| | Mn | 19.510 | 19.6 |
| Transition metal (wt %) | | 64.4 | 64.6 |
| Particle size after 1 hour of reaction (μm) | | 6.53 | 2.26 |
| Specific surface area(m²/g) | | 7.50 | 2.43 |

Referring to Table 2, the composition of the nickel-based active material precursor according to Example 1 was identified. In addition, the particle size of the nickel-based active material precursor according to Example 1 was increased when compared with that of Comparative Example 1 after 1 hour of reaction. Also, the nickel-based active material precursor according to Example 1 was an increased specific surface area when compared with that of Comparative Example 1. Thus, lithium secondary batteries having increased efficiency and capacity may be manufacturing by using the nickel-based active material precursor according to Example 1.

Evaluation Example 3

X-Ray Diffraction (XRD) Analysis

Crystal structures of the nickel-based active material precursors prepared according to Example 1 and Comparative Example 1 were analyzed by X-ray diffraction (XRD). The XRD was performed by using an X'pert pro (PANalytical) with Cu Kα radiation (1.54056 Å).

XRD analysis results are shown in Table 3 below and it may be confirmed that the crystal plane (001) is well developed in Example 1.

TABLE 3

| Item | Example 1 | Comparative Example 1 |
|---|---|---|
| FWHM of peak corresponding to crystal plane (001) (°) | 0.728 | 0.506 |
| FWHM of peak corresponding to crystal plane (100) (°) | 0.534 | 0.489 |
| FWHM of crystal plane (102) (°) | 1.690 | 1.380 |
| a (Å) | 3.024 | 3.042 |
| c (Å) | 4.608 | 4.590 |
| c/a | 1.518 | 1.506 |

Referring to Table 3, it was confirmed that the crystal plane (001) was well developed in the nickel-based active material precursor according to Example 1 because a full width at half maximum (FWHM) of a (001) peak was 0.7 or greater when compared with the nickel-based active material precursor according to Comparative Example 1.

Evaluation Example 4

SEM Analysis

Surfaces and cross-sections of particles of the nickel-based active material precursor prepared according to Example 1 and particles of the nickel-based active material precursor prepared according to Comparative Example 1 were analyzed using a scanning electron microscope (SEM). A Magellan 400L (FEI company) was used as the scanning electron microscope. Cross-sections of samples were pre-processed by milling using a CP2 manufactured by JEOL at 6 kV and 150 µA for 4 hours. In addition, the SEM analysis was performed at 350 V.

As a result of SEM analysis on the surfaces of the nickel-based active material precursors, primary particles are well oriented and pores are well developed between the primary particles in the nickel-based active material precursor of Example 1, and thus a structure effective for intercalation and deintercalation of lithium may be formed after heat treatment in the preparation of the nickel-based active material.

In addition, as a result of SEM analysis on the cross-sections of the nickel-based active material precursors, the nickel-based active material precursor according to Comparative Example 1 has a structure in which the core had no pore. On the contrary, the nickel-based active material precursor according to Example 1 has a structure in which a porous core is formed and pores are also distributed with a gradient in the shell as well as the core.

Evaluation Example 5

Porosity Analysis

SEM analysis was also carried out on the particles of the nickel-based active material precursors prepared according to Examples 1 to 3 and Comparative Examples 1 and 2. A Magellan 400L (FEI company) was used as the scanning electron microscope. Cross-sections of samples were pre-processed by milling using a CP2 manufactured by JEOL at 6 kV and 150 µA for 4 hours. In addition, the SEM analysis was performed at 350 V.

The analysis results are shown in Table 4 below. In Table 4 below, the porosity refers to a ratio of an area occupied by pores to a total area.

TABLE 4

| Item | Example 1 | Example 2 | Example 3 | Comparative Example 1 |
|---|---|---|---|---|
| Porosity of core (%) | 18.5 | 15.0 | 20.2 | 1.6 |
| Porosity of intermediate layer (%) | 12.5 | 10.1 | 14.5 | 2.4 |
| Porosity of shell (%) | 1.7 | 2.1 | 1.2 | 3.3 |

Referring to Table 4, it was confirmed that particles of the nickel-based active material precursor prepared according to Example 1 had a porous structure in which the core had a higher porosity than that of the shell and pores were developed.

On the contrary, the nickel-based active material precursor obtained according to Comparative Example 1 did not have a structure including the core, the intermediate layer, and the shell which was shown in the nickel-based active material precursor according to Example 1. In addition, the nickel-based active material precursor obtained according to Comparative Example 2 did not have porosity gradually decreasing in the order of the core, the intermediate layer, and the shell which is a characteristic according to Example 1.

Evaluation Example 7

Surface Analysis using SEM

The nickel-based active material precursor prepared according to Example 1 was analyzed using a scanning electron microscope. Based on the SEM analysis results, it was confirmed that the shape of primary particles of the nickel-based active material precursor according to Example 1 was an arrangement of plate particles.

Evaluation Example 8

High Temperature Lifespan

High temperature lifespans of the coin half cells prepared according to Manufacture Examples 1 and 2 and Comparative Example 1 were evaluated according to the following method.

First, each of the coin half cells was charged and discharged once with 0.1 C for formation and then charged and discharged once with 0.2 C to identify initial charging and discharging characteristics. While repeating the charge/discharge process 50 times at 45° C. with 1 C, cycle characteristics were examined. The charge process was set to begin in a constant current (CC) mode, be converted into a constant voltage (CV) mode, and be cut off at 4.3 V with 0.05 C, and the discharge process was set to be cut off in a CC mode at 3.0 V.

Figure 4:
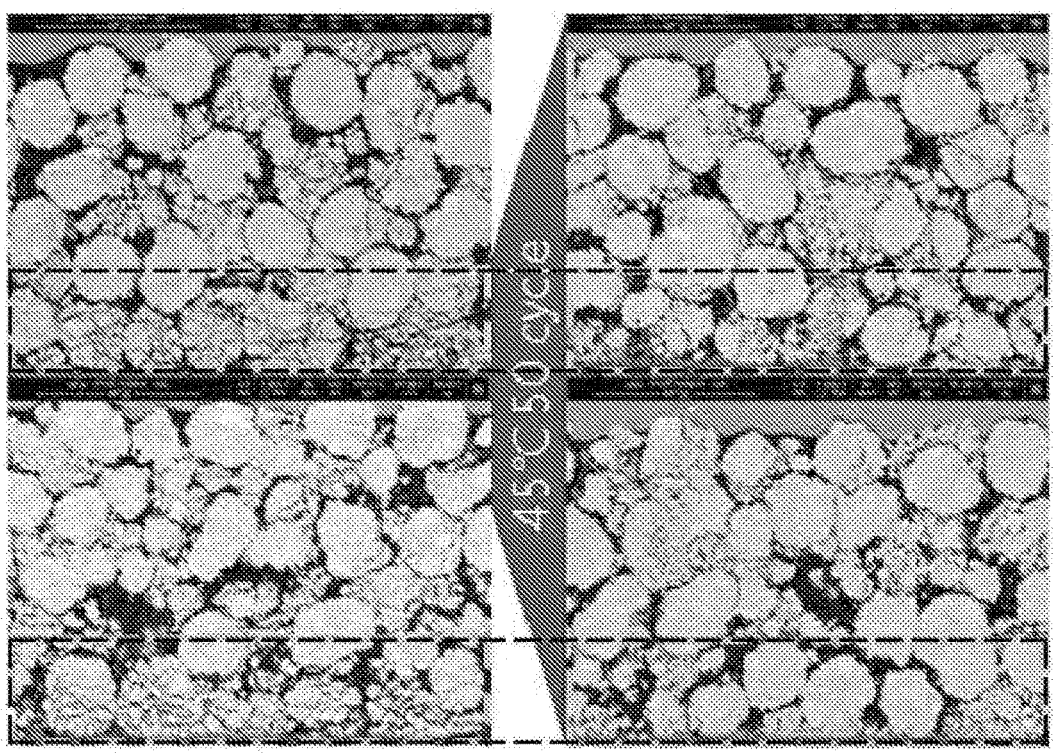
FIGS. 3 and 4 are scanning electron microscope images showing states of cathodes of coin half-cells prepared according to Manufacture Examples 1 and 2 and Comparative Example 1 after evaluation of lifespan characteristics at high temperature.
Figure 3:
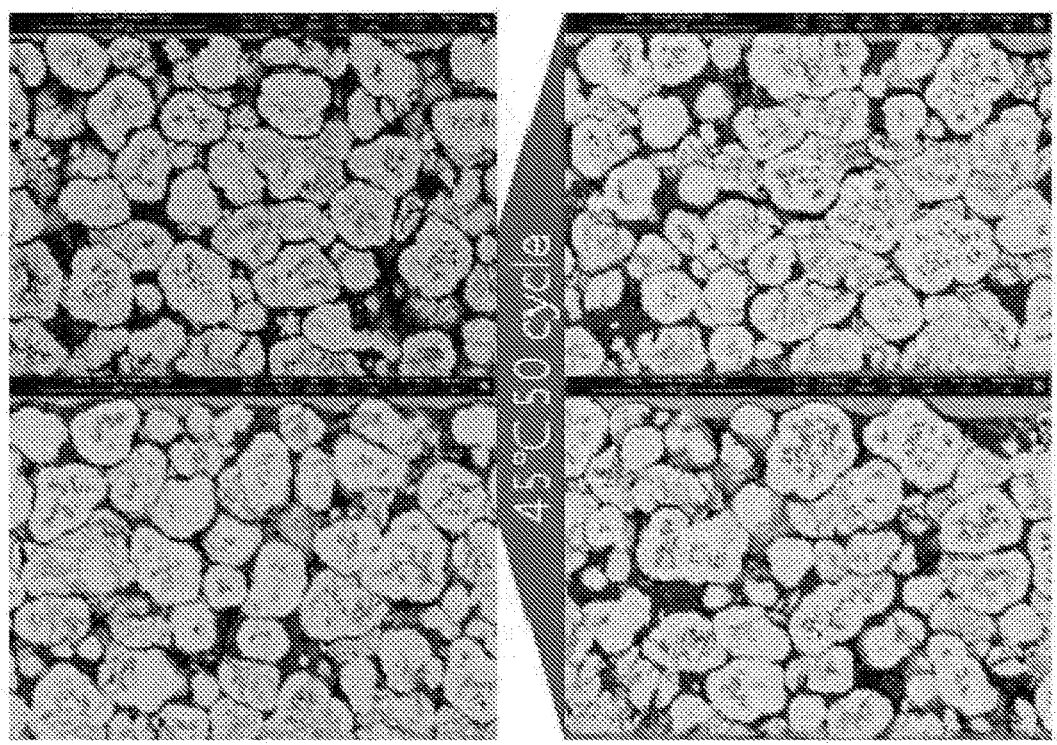

Changes in discharge capacity according to repeated cycles are shown in Table 7 below. In addition, FIGS. 3 and 4 are SEM images of cross-sections of cathodes of the coin half cells according to Example 1 and Comparative Example 1, respectively, after evaluation of lifespan characteristics at high temperature. It was confirmed that almost no cracks occurred according to Example 1, while many cracks occurred according to Comparative Example 1.

TABLE 6

| Item | Example 1 | Example 2 | Comparative Example 1 |
|---|---|---|---|
| Lifespan (%) | 98.0 | 98.5 | 97.3 |

Referring to this, it was confirmed that the coin half cells according to Manufacture Examples 1 and 2 had excellent lifespan characteristics at high temperature.

Evaluation Example 9

Charging and Discharging Characteristics (Initial Efficiency)

First, each of the coin half cells prepared according to Manufacture Examples 1 and 2 and Comparative Preparation Example 1 was charged and discharged once with 0.1 C for formation and then charged and discharged once with 0.2 C to identify initial charging and discharging characteristics. While repeating the charge/discharge process 50 times with 1 C, cycle characteristics were examined. The charge process was set to begin in a constant current (CC) mode, be converted into a constant voltage (CV) mode, and be cut off at 4.3 V with 0.05 C, and the discharge process was set to be cut off in a CC mode at 3.0 V.

(1) Initial Charge/discharge Efficiency (I.C.E)

Measurement was performed according to Equation 1 below.

$$\text{Initial charge/discharge efficiency [\%]} = [\text{Discharge capacity at } 1^{st}\text{cycle/Charge capacity at } 1^{st}\text{cycle}] \times 100 \quad \text{Equation 1}$$

Initial charge/discharge efficiencies of coin half cells according to Example 4 and Comparative Example 3 were evaluated and the results are shown in Table 7 below.

TABLE 7

| Example | Charge capacity (mAh/g) | Discharge capacity (mAh/g) | I.C.E (%) |
|---|---|---|---|
| Preparation Example 1 | 193.2 | 183.8 | 95.13 |
| Preparation Example 2 | 198.5 | 189.9 | 95.66 |
| Comparative Preparation Example 1 | 200.0 | 180.9 | 90.45 |

Referring to Table 7, the coin half cells according to Manufacture Examples 1 and 2 had higher charge/discharge efficiencies than that of Comparative Preparation Example 1.

Evaluation Example 10

Charging and Discharging Characteristics (Rate Performance)

Each of the coin half cells prepared according to Manufacture Examples 1 and 2 and Comparative Preparation Example 1 was charged under the conditions of a constant current (0.2 C) and a constant voltage (4.3 V, 0.05 C cut-off), rested for 10 minutes, and discharged under the conditions of a constant current (0.2 C, 0.33 C, 0.5 C, 1 C, 2 C, or 3 C) until the voltage reached 3.0 V. That is, high-rate discharge characteristics (rate capabilities) of each coin half cell were evaluated periodically changing the discharge rate at 0.2 C, 0.33 C, 0.5 C, 1 C, 2 C, or 3 C while the number of charging and discharging cycles increases. However, each cell was discharged at a rate of 0.1 C during the $1^{st}$ to $3^{rd}$ charging and discharging cycles. In this regard, the high-rate discharge characteristics are represented by Equation 2 below.

$$\text{High-rate Discharge Characteristics(\%)} = (\text{Discharge capacity when discharging cell at predetermined constant current rate})/(\text{Discharge capacity when discharging cell at 0.1 C rate}) \times 100 \quad \text{Equation 2}$$

The results of the high-rate discharge characteristics are shown in Table 8 below.

TABLE 8

| | 0.2 C | 0.5 C | 1 C | 2 C |
|---|---|---|---|---|
| Preparation Example 1 | 182.7 | 178.1 | 173.4 | 167.7 |
| Preparation Example 2 | 187.3 | 182.9 | 177.1 | 170.0 |
| Comparative Preparation Example 1 | 178.2 | 173.1 | 167.8 | 162.3 |

Referring to Table 8, the coin half cells prepared according to Manufacture Examples 1 and 2 had excellent high-rate discharge characteristics when compared with the coin half cell prepared according to Comparative Preparation Example 1.

Evaluation Example 11

SEM Analysis

The nickel-based active material precursors prepared according to Example 1 and Comparative Example 2 were partially broken and cross-sections thereof were evaluated by SEM analysis.

Referring to this, as a result of identifying a structure of a cross-section of the broken nickel-based active material precursor according to Example 1, it was confirmed that the primary particles had a plate structure.

While one or more exemplary embodiments have been described with reference to the manufacture examples and examples, it will be understood by those of ordinary skill in the art that various changes in form and details may be made therein without departing from the spirit and scope as defined by the following claims.

The invention claimed is:

1. A nickel-based active material precursor for a lithium secondary battery, comprising a core, an intermediate layer located on the core, and a shell located on the intermediate layer,
    wherein porosity gradually decreases in the order of the core, the intermediate layer, and the shell, and
    each of the intermediate layer and the shell has a radial arrangement structure.

2. The nickel-based active material precursor of claim 1, wherein the core has a porosity of 15 to 20% and a pore size of 150 nm to 1 µm.

3. The nickel-based active material precursor of claim 1, wherein the shell has a porosity of 2% or less and a pore size of less than 150 nm.

4. The nickel-based active material precursor of claim 1, wherein the intermediate layer has a porosity of 10% to 15%.

5. The nickel-based active material precursor of claim 1, wherein an average particle diameter of the nickel-based active material precursor is in a range of 9 to 14 µm.

6. The nickel-based active material precursor of claim 1, wherein the nickel-based active material precursor comprises plate particles, and major axes of the plate particles are arranged in a radial direction.

7. The nickel-based active material precursor of claim 1, wherein the nickel-based active material precursor is a compound represented by Formula 1 below:

$$Ni_{1-x-y-z}Co_xMn_yM_zOH \quad \text{Formula 1}$$

wherein in Formula 1, M is an element selected from the group consisting of boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and $x \leq (1-x-y-z)$, $y \leq (1-x-y-z)$, $0<x<1$, $0 \leq y<1$, and $0 \leq z<1$ are satisfied.

8. The nickel-based active material precursor of claim 7, wherein an amount of nickel contained in the nickel-based active material precursor is in a range of 0.33 to 0.95 mol % based on a total amount of transition metals (Ni, Co, and Mn) and is higher than an amount of each of manganese and cobalt contained in the nickel-based active material precursor.

9. The nickel-based active material precursor of claim 1, wherein the nickel-based active material precursor is $Ni_{0.6}Co_{0.2}Mn_{0.2}(OH)_2$, $Ni_{0.5}CO_{0.2}Mn_{0.3}(OH)_2$, $Ni_{0.33}Co_{0.33}Mn_{0.33}(OH)_2$, $Ni_{0.8}CO_{0.1}Mn_{0.1}(OH)_2$, or $Ni_{0.85}Co_{0.1}Al_{0.05}(OH)_2$.

10. A nickel-based active material for a lithium secondary battery obtained from the nickel-based active material precursor for a lithium secondary battery according to claim 1.

11. A lithium secondary battery comprising a cathode including the nickel-based active material for a lithium secondary battery of claim 10, an anode, and an electrolyte interposed between the cathode and the anode.

12. A method of producing a nickel-based active material precursor for a lithium secondary battery, the method comprising:
a first process of forming a core of the nickel-based active material precursor by reacting a complexing agent, a pH regulator, and a metal raw material for forming the nickel-based active material precursor;
a second process of forming an intermediate layer on the core obtained in the first process; and
a third process of forming a shell on the intermediate layer obtained in the second process,
wherein stirring powers of the second process and the third process are lower than that of the first process.

13. The method of claim 12, wherein pH levels of reaction mixtures of the respective first process, the second process, and the third process are the same.

14. The method of claim 12, wherein concentrations of the complexing agent gradually increase in the order of the first process, the second process, and the third process.

* * * * *